United States Patent [19]

Kuhrdt

[11] Patent Number: 4,689,622
[45] Date of Patent: Aug. 25, 1987

[54] PROVISIONS FOR THE SUPPRESSION OF MUTUAL JAMMER INTERFERENCE IN A FLYING BODY

[75] Inventor: Günther Kuhrdt, Elchingen, Fed. Rep. of Germany

[73] Assignee: Licentia Patent-Verwaltungs-GmbH, Frankfurt am Main, Fed. Rep. of Germany

[21] Appl. No.: 683,562

[22] Filed: Dec. 19, 1984

[30] Foreign Application Priority Data

Dec. 21, 1983 [DE] Fed. Rep. of Germany ....... 3346156

[51] Int. Cl.$^4$ ............................................. H04K 3/00
[52] U.S. Cl. ......................................... 342/14; 455/1; 342/188
[58] Field of Search ...................... 343/7.5, 18 E, 374, 343/403, 406; 455/1, 49, 51, 63, 67, 69, 73, 74, 78, 79; 342/13–20

[56] References Cited

U.S. PATENT DOCUMENTS

| | | | |
|---|---|---|---|
| 3,377,592 | 4/1968 | Robieux et al. | 343/429 |
| 3,757,342 | 9/1973 | Jasik et al. | 343/738 |
| 3,761,936 | 9/1973 | Archer et al. | 343/754 |
| 3,870,995 | 3/1975 | Nielson | 343/18 E |
| 4,025,920 | 5/1977 | Reitboeck et al. | 342/113 |
| 4,357,709 | 11/1982 | Butler et al. | 455/1 X |

FOREIGN PATENT DOCUMENTS 3106032 8/1982 Fed. Rep. of Germany .

OTHER PUBLICATIONS

M. Skolnik, *Intro. to Radar Systems*; p. 227 (McGraw-Hill, 1980).
R. C. Hansen, "Microwave Scanning Antennas", *Apertures*, vol. 1, (1964), pp. 220 and 221.

Primary Examiner—T. H. Tubbesing
Assistant Examiner—Bernarr Earl Gregory
Attorney, Agent, or Firm—Spencer & Frank

[57] ABSTRACT

Antenna and processing provisions for the suppression of mutual interference between flying bodies used for jamming radio/radar transmitting and receiving systems. A transmitting and receiving device is contained within the flying body for generating jamming signals in dependence of received signals. A transmitting and receiving antenna arrangement is installed on the flying body and connected to the transmitting and receiving device for producing a plurality of directional and linearly polarized electromagnetic radiation patterns covering respective azimuthal sectors, the patterns each having a major beam direction and a polarization plane which has a 45° inclination with respect to a horizontal reference plane when the flying body is in the normal flight attitude, the inclination with respect to the horizontal plane being in the same direction for all of the patterns with respect to the respective major beam direction as viewed from said flying body. The transmitter section of the flying body contains an identification modulator with preprogrammed AM identification. The receiver section of the flying body contains an identification demodulator recognizing identification signatures in order to inhibit jamming of own-type flying bodies. Identification means and stored selection parameters serve to prohibit jamming of own-type radio/radar equipment.

9 Claims, 4 Drawing Figures

PROVISIONS FOR THE SUPPRESSION OF MUTUAL JAMMER INTERFERENCE IN A FLYING BODY

BACKGROUND OF THE INVENTION

The invention relates to an antenna and a processing arrangement for the suppression of mutual jammer interference particularly between flying bodies used for jamming radio/radar transmitting and receiving systems. Such flying bodies are also known as harassment drones.

During their missions, flying bodies used for jamming generally cover a large area in which there exist groundbased or airborne radio/radar systems, and monitor this area for the occurrence of signals from such systems, for example the emission of data, voice communication or radar pulses. By transmitting jamming signals whose RF carrier is spottuned to the frequency of the received signals, they significantly interfere with the operation of the interrupted systems by forcibly raising their false alarm rate. Unfortunately, they will also mutually interfere with own-type jammers operating in proximity such that "ringing" between the receive/transmit portions of two or more such systems may be caused. An antenna system for a flying body for jamming ground-based signal transmitting and receiving stations in dependence of signals received at the flying body is disclosed in applicant's copending U.S. patent application Ser. No. 683,563, filed concurrently herewith, the disclosure of which is incorporated herein by reference.

SUMMARY OF THE INVENTION

It is an object of the present invention to provide a flying body of the above-described type which can be used to jam a plurality of radio-radar systems over an extensive area while suppressing or decreasing mutual interference when an ensemble of such flying bodies is operated in proximity.

The above and other objects are accomplished in accordance with the invention by the provision of an antenna system forming a combination with a flying body for jamming radio/radar transmitting and receiving devices, including: transmitting, receiving and processing means contained within the flying body for generating jamming signals in dependence of received signals; and a transmitting and receiving antenna arrangement installed on the flying body and connected to the transmitting and receiving means for producing a plurality of directional and linearly polarized electromagnetic radiation patterns covering respective azimuthal sectors, the patterns each having a major beam direction and a polarization plane which has a 45° inclination with respect to a horizontal reference plane when the flying body is in the normal flight attitude, the inclination with respect to the horizontal plane being in the same direction for all of the patterns with respect to the respective major beam direction as viewed from the flying body; further comprising an identification demodulator circuit in the receiver processor meant to recognize and suppress responses against emissions of own-type jammers operating in proximity, and a respective identification modulator in its transmitter section.

BRIEF DESCRIPTION OF THE DRAWINGS

The invention will be described in greater detail below with the aid of the drawings.

DESCRIPTION OF THE PREFERRED EMBODIMENTS

Figure 1:
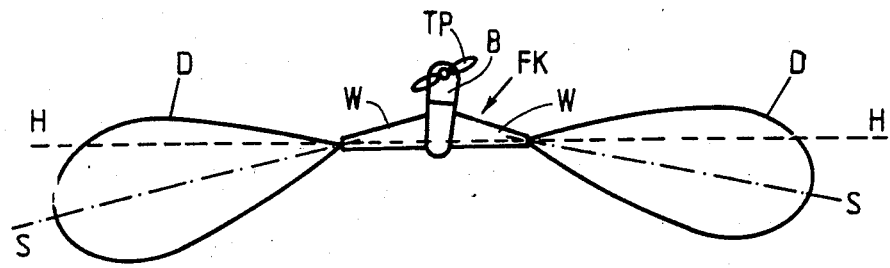
FIG. 1 is a schematic showing the rear view of a flying body and its directional radiation patterns according to the invention.
Figure 2:
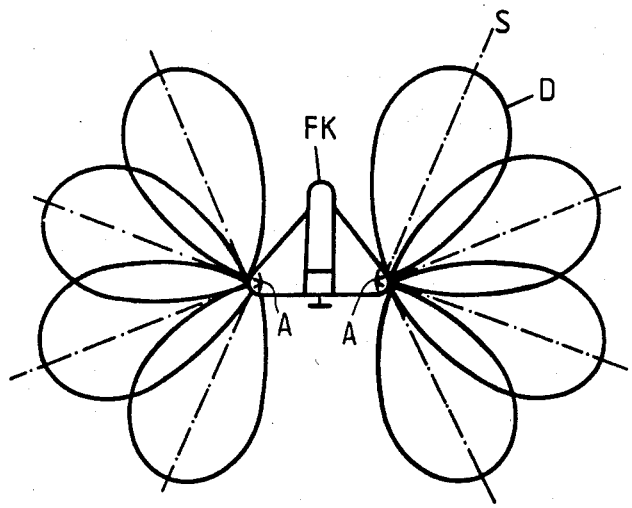
FIG. 2 is a schematic showing the plan view of the flying body of FIG. 1 and its directional radiation patterns.

Referring to the drawings, a total of e.g. eight directional antennas shown generally at A in FIG. 2 are arranged at the peripheral portions of a flying body FK, such as at the wing tips W thereof. Flying body FK is driven by a tail propeller TP. The antennas A are accommodated in two groups of four at the ends of the wings W, respectively. The directional antennas produce partially overlapping directional electro-magnetic radiation patterns D which are oriented in respective azimuthul directions. The directional antennas thus cover the entire azimuth range as shown in FIG. 2. The arrangement of the directional antennas at the periphery of the flying body prevents shading effects caused by the fuselage portion B of the flying body.

The directional antenna patterns D have major axes S which may be slightly inclined relative to the horizontal plane H in order to improve ground coverage. This results in a large area of coverage which, for example, for major lobe coincidence between the flying body and a ground radar system is only limited by the horizon as a function of flight attitude.

However, the near-horizontal orientation of the antennas brings about the problem that, with simultaneous use of a plurality of flying bodies, the jamming systems of two flying bodies may mutually excite one another, causing a "ringing" effect where one system responds to the other in a closed loop. Therefore, according to a primary feature of the invention, all individual antennas are linearly polarized, with the polarization planes being inclined by 45° with respect to the horizontal plane. The angle with the horizontal plane is the same for the polarization planes of all antennas with respect to the respective major radiation direction as seen from the flying body.

Figure 3:
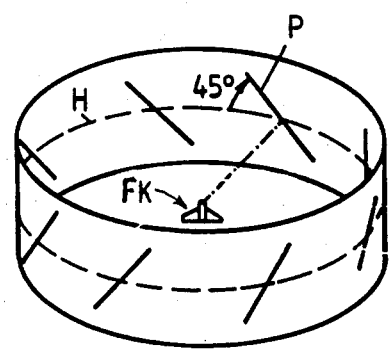
FIG. 3 is a perspective view of the position of the polarization planes of the directional radiation patterns according to the invention.

In FIG. 3, the polarization planes P of the plurality of antennas are shown as lines intersecting a fictitious cylinder surrounding the flying body FK. Polarization planes P are rotated clockwise by 45° with respect to the horizontal plane H when seen from the flying body. Thus, the mutually facing antennas of two flying bodies approaching one another whose antenna polarization planes are inclined in the same sense with respect to the horizontal, are always cross polarized with respect to one another. Polarization decoupling of adjacently operating flying bodies is thus maximized. The simultaneous use of a plurality of such flying bodies in the same area with the same or at least overlapping frequency ranges is therefore a preferred application of the present invention, with the prerequisite that the 45° slant of the polarization planes of the individual antennas in all flying bodies with respect to the respective major beam direction is oriented in the same direction, i.e. either +45° or −45°.

The 45° inclination of the polarization planes with respect to the horizontal plane has the additional advantage that the polarization mismatch against target systems whose polarization is horizontal, vertical or circular is approximately a constant 3 dB.

A further feature of the invention provides that, for the complete suppression of mutual excitation between two adjacently operating flying bodies, each flyiny body is provided with an identification modulator which provides the emitted jamming signals with a preprogrammed AM identification and with an identification demodulator which recognizes the identifications of all other flying bodies. When a signal is received from another flying body, this is recognized as such by way of a comparison with the stored identifications of the other flying bodies and the jamming process is suppressed.

In the same way, it is possible to avoid jamming of "friendly" systems by simply inhibiting their allocated frequency channels before the flying body is launched. Alternatively, as a matter of additional complexity, each flying body may be equipped for the detection of special signal signatures contained in signals received from known transmitting devices in order to suppress jamming of such systems.

Figure 4:
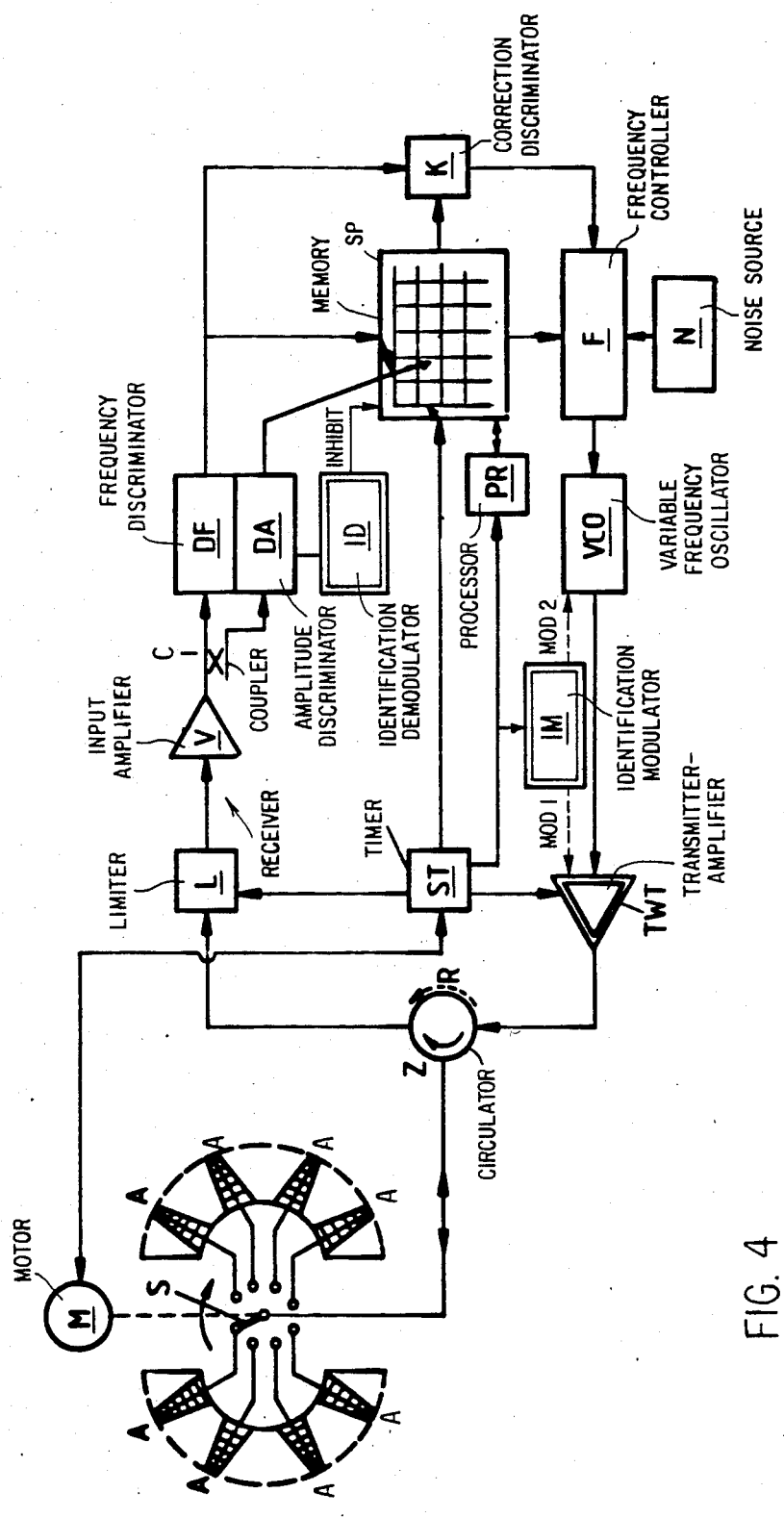
FIG. 4 is a circuit schematic showing particular encode/decode suppress components of a specific embodiment of the invention.

Referring to FIG. 4, eight individual transmit/-receive antennas A of the antenna arrangement, which are preferably provided as log. periodic dipoles in the form of printed circuits in a manner known, for example, from U.S. Pat. No. 3,377,592 Robieux, or U.S. Pat. No. 3,757,342-Jasik, are switched by means of a mechanical switch S which is driven by a motor M. Alternatively, electronic switching may be provided by an array of PIN diodes. The antennas are linearly polarized and their polarization planes are inclined 45° with respect to an imaginary horizontal plane as shown in FIG. 3. A timer ST, which is synchronized with motor M, and has outputs connecte wtih a limiter L at the front end of a receiver (generally denoted by the arrow in FIG. 4) and a transmitter amplifier TWT, switches the system into the receive mode for one revolution of the switch and thereafter, for one or a plurality of revolutions, into the transmit mode.

During the receive mode, the transmitter amplifier TWT is disabled by timer ST and the receiver input at limiter L is enabled. Received signals reaching the receiver from the antennas A via circulator Z, are fed, via input amplifier V, to frequency discriminator DF, amplitude sensor DA and to the additional identification demodulator ID. Normally, amplitude sensor DA stores it amplitude information in the pertinent row (antenna number) and column (frequency slot) of a memory matrix SP. Whenever the additional identification demodulator ID senses the "OWN SYSTEM" signal envelope, however, this entry will be inhibited, thus prohibiting subsequent jamming.

During the transmit mode, transmitter amplifier TWT is gated on and the transmitted signal is fed, via circulator Z, to the presently connected antenna A. Though the receiver input is blocked by limiter L, a sample of transmitter RF is fed by residual coupling of coupler C to the frequency discriminator DF. Frequency controller F controls the frequency of the output of variable frequency oscillator VCO in a closed control loop according to the command value from the matrix processor PR, and the actual frequency as sensed by frequency discriminator DF. The output of oscillator VCO is connected to the input of transmitter amplifier TWT. Either the transmitter amplifier TWT or oscillator VCO is provided with a preprogrammed AM envelope identification by an identification modulator IM for recognition by the receiving devices of other flying bodies.

It will be understood that the above description of the present invention is susceptible to various modifications, changes and adaptations, and the same are intended to be comprehended within the meaning and range of equivalents of the appended claims.

What is claimed is:

1. A system for the suppression of mutual jammer interference between a plurality of flying bodies used for jamming radio transmitting and receiving systems, wherein each flying body includes:

transmitting, receiving and processing means for generating jamming signals in dependence of received signals, and a transmitting and receiving antenna means, connected to said transmitting and receiving means, for producing a plurality of directional and linearly polarized electromagnetic radiation patterns covering respective azimuthal sectors, with the patterns each having a major beam direction and a polarization plane which has a 45° inclination with respect to a horizontal reference plane formed by the surface of the earth when the flying body is in the normal flight attitude; and, wherein the 45° inclination with respect to said horizontal plane of each said pattern produced by each said antenna means of said plurality of flying bodies is in the same direction as viewed from a respective one of the flying bodies along a respective one of the major beam directions.

2. The system defined in claim 1, wherein the directional patterns of each said antenna means each have a major axis which is slightly inclined downwardly toward the horizontal plane in order to optimize ground coverage as a function of flight attitude.

3. The system defined in claim 1, wherein each said transmitting and receiving antenna means includes a plurality of individual antennas which are distributed at peripheral portions of the respective said flying body.

4. The system defined in claim 3, wherein each of said individual antennas comprises a log-periodic dipole formed by a printed circuit design.

5. The system of claim 1, wherein the transmitting, receiving and processing means of each said flying body includes: an identification modulator means for modulating a jamming signal with an AM signature representing an identification of that flying body; an identification demodulator means for detection of an AM signature in a received signal and for producing a signal in response to such detection which produces an erase signal for suppressing the transmission of jamming signals in a subsequent transmit period of that flying body.

6. The system defined in claim 1, wherein the transmitting receiving and processing means of each said flying body includes storage means for storing selection criteria such as inhibited frequency slots or other emission characteristics of own radio systems in order to prohibit jamming of services provided by such own systems.

7. The system defined in claim 6, wherein each said storage means includes sensor means for the detection of additional own signal characteristics in order to prohibit jamming of own services.

8. The system defined in claim 1, wherein each said flying body further includes sensor means for the detection of own signal characteristics in order to prohibit jamming of own services.

9. The system defined in claim 1, wherein each said flying body further includes an identification demodulator circuit means in its receiver section for recognizing, and suppressing responses against, received emissions of own-type jammers operating in proximity, and a respective identification modulator in its transmitter section.

* * * * *